United States Patent
Willmott et al.

(10) Patent No.: US 12,020,166 B2
(45) Date of Patent: Jun. 25, 2024

(54) META-LEARNED, EVOLUTION STRATEGY BLACK BOX OPTIMIZATION CLASSIFIERS

(71) Applicant: Robert Bosch GmbH, Stuttgart (DE)

(72) Inventors: Devin T. Willmott, Pittsburgh, PA (US); Christian Daniel, Leonberg (DE); Jeremy Kolter, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 650 days.

(21) Appl. No.: 16/888,136

(22) Filed: May 29, 2020

(65) Prior Publication Data

US 2021/0374549 A1 Dec. 2, 2021

(51) Int. Cl.
*G06N 3/08* (2023.01)
*G06N 3/086* (2023.01)

(52) U.S. Cl.
CPC .................... *G06N 3/086* (2013.01)

(58) Field of Classification Search
CPC ........ G06N 3/086; G06N 3/126; G06N 3/084; G06N 3/08; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS

| | | | | |
|---|---|---|---|---|
| 8,725,871 B2* | 5/2014 | Ding | .................. | G06F 11/3089 370/254 |
| 2018/0150538 A1* | 5/2018 | Srivastava | ............. | G06Q 30/00 |
| 2018/0181865 A1 | 6/2018 | Adachi | | |
| 2020/0111578 A1* | 4/2020 | Koblick | ................. | G16H 20/10 |
| 2021/0089832 A1* | 3/2021 | Gonzalez | ................ | G06F 17/11 |
| 2021/0090694 A1* | 3/2021 | Colley | .................... | G16B 40/00 |
| 2021/0110274 A1* | 4/2021 | Tripathi | .................. | G06F 17/18 |

(Continued)

FOREIGN PATENT DOCUMENTS

| CN | 108009636 A | * | 5/2018 | .......... G06N 3/0635 |
|---|---|---|---|---|
| CN | 108009636 B | * | 12/2021 | .......... G06N 3/0635 |
| WO | WO-2019166710 A1 | * | 9/2019 | .......... G05B 19/042 |

OTHER PUBLICATIONS

Patrick et al., "Testing Stochastic Software Using Pseudo-Oracles", Jul. 20, 2016, pp. 235-246 (Year: 2016).*

(Continued)

*Primary Examiner* — Paulinho E Smith
(74) *Attorney, Agent, or Firm* — Brooks Kushman P.C

(57) ABSTRACT

A computational method for training a meta-learned, evolution strategy black box optimization classifier. The method includes receiving one or more training functions and one or more initial meta-learning parameters of the optimization classifier. The method further includes sampling a sampled objective function from the one or more training functions and an initial mean of the sampled function. The method also includes computing a set of T number of means by running the meta learned, evolution strategy classifier on the sampled objective function using the initial mean for T number of steps in t=1, . . . , T. The method also includes computing a loss function from the set of T number of means. The method further includes updating the one or more initial meta-learning parameters of the optimization classifier in response to a characteristic of the loss function.

19 Claims, 5 Drawing Sheets

(56) References Cited

U.S. PATENT DOCUMENTS

| | | | |
|---|---|---|---|
| 2021/0174262 A1* | 6/2021 | Du | G06Q 10/04 |
| 2022/0108215 A1* | 4/2022 | Choromanski | G06N 20/00 |
| 2022/0261654 A1* | 8/2022 | Wu | G06F 17/18 |

OTHER PUBLICATIONS

Srikanth Reddy Gagganapalli, "Implementation and Evaluation of CMA-ES Algorithm", Nov. 2015, pp. 1-57 (Year: 2016).*

Shirakawa et al., "Sample Reuse in the Covariance Matrix Adaptation Evolution Strategy Based on Importance Sampling", DOI: http://dx.doi.org/10.1145/2739480.2754704, GECCO '15, Jul. 11-15, 2015, Madrid, Spain, 8 pages.

Kingma et al., "Auto-Encoding Variational Bayes", arXiv:1312.6114v10 [stat.ML] May 1, 2014, 14 pages.

Glasmachers et al., "Exponential Natural Evolution Strategies", 8 pages.

Nikolaus Hansen, "The CMA Evolution Strategy: A Tutorial", arXiv:1604.00772v1 [cs.LG] Apr. 4, 2016, 39 pages.

Volpp et al., "Meta-Learning Acquisition Functions for Transfer Learning in Bayesian Optimization", Published as a conference paper at ICLR 2020, arXiv:1904.02642v5 [stat.ML] Feb. 14, 2020, 22 pages.

Andrychowicz et al., "Learning to learn by gradient descent by gradient descent", 30th Conference on Neural Information Processing Systems (NIPS 2016), Barcelona, Spain, 9 pages.

\* cited by examiner

US 12,020,166 B2

META-LEARNED, EVOLUTION STRATEGY BLACK BOX OPTIMIZATION CLASSIFIERS

TECHNICAL FIELD

The present disclosure relates to computational methods and computer systems for training and providing meta-learned, evolution strategy black box optimization classifiers (e.g. machine learning (ML) algorithms).

BACKGROUND

A black box function is a function for which the analytical form is not known. Black box functions may be unknown or too complex to model directly. Optimization models have been developed to optimize black box functions. One existing family of black box optimizers are referred to as evolution strategies. An evolution strategy is an optimization technique based on evolutionary concepts. Evolution strategies are utilized with non-linear or non-convex continuous optimization problems.

One known evolution strategy is the exponential natural evolution strategy (xNES). The xNES includes an exponential parameterization of a search distribution to guarantee invariance. The xNES is configured to compute a natural gradient without the need of an explicit Fisher information matrix. Another evolution strategy is referred to as a covariance matrix adaptation evolution strategy (CMA-ES). The CMA-ES uses a maximum-likelihood principle that increases the probability of successful candidate solutions and search steps. The CMA-ES also records two different paths of the time evolution of the distribution mean of the strategy, which is otherwise referred to as search or evolution paths. In contrast to other optimization methods, the CMA-ES requires fewer assumption on the nature of the black box function. The CMA-ES does not require derivatives or the function values themselves, but rather ranks candidate solutions to find the best one.

SUMMARY

According to one embodiment, a computational method for training a meta-learned, evolution strategy black box optimization classifier is disclosed. The method includes receiving one or more training functions and one or more initial meta-learning parameters of the meta-learned, evolution strategy black box optimization classifier. The method further includes sampling a sampled objective function from the one or more training functions and an initial mean of the sampled function. The method also includes computing a set of T number of means by running the meta-learned, evolution strategy black box optimization classifier on the sampled objective function using the initial mean for T number of steps in $t=1, \ldots, T$. The method also includes computing a loss function from the set of T number of means. The method further includes updating the one or more initial meta-learning parameters of the meta-learned, evolution strategy black box optimization classifier in response to a characteristic of the loss function.

In another embodiment, a computational method for learning an actuator control command from a meta-learned, evolution strategy black box optimization classifier having one or more parameters. The computational method includes sampling and transforming a generation of samples A into a generation of transformed samples $\lambda$. The computational method further includes ranking the generation of transformed samples $\lambda$ in response to one or more function evaluations of the generation of transformed samples $\lambda$. The method also includes updating the one or more parameters of the meta-learned, evolution strategy black box optimization classifier in response to the ranked generation of transformed samples $\lambda$ and one or more learned parameters. The one or more learned parameters may be trained on a set of objective functions similar to (e.g. sharing a functional characteristic with) the learned, evolution strategy black box optimization classifier. The method also includes sending input signals obtained from a sensor into the updated meta-learned, evolution strategy black box optimization classifier to obtain output signals configured to characterize a classification of the input signals. The method also includes transmitting an actuator control command to an actuator of computer-controlled machine in response to the output signals.

In yet another embodiment, a computational method for training and using a meta-learned, evolution strategy black box optimization classifier is disclosed. The computational method includes receiving one or more learned parameters trained on a set of objective functions similar to (e.g. sharing a functional characteristic with) the learned, evolution strategy black box optimization classifier. The computational method also includes updating the meta-learned, evolution strategy black box optimization classifier with the one or more learned parameters in response to a generation of samples $\lambda$.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
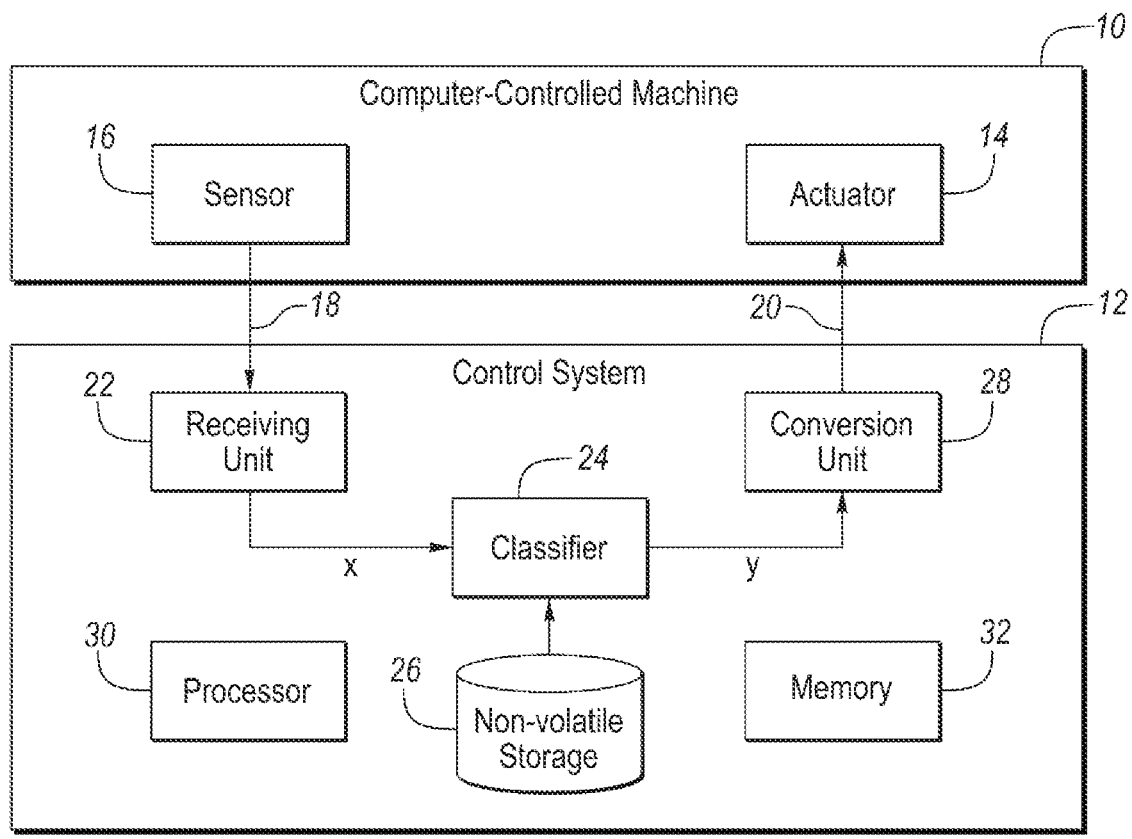
FIG. 1 depicts a schematic diagram of an interaction between a computer-controlled machine and a control system according to one embodiment.

FIG. 1 depicts a schematic diagram of an interaction between computer-controlled machine 10 and control system 12. Computer-controlled machine 10 includes actuator 14 and sensor 16. Actuator 14 may include one or more actuators and sensor 16 may include one or more sensors. Sensor 16 is configured to sense a condition of computer-controlled machine 10. Sensor 16 may be configured to encode the sensed condition into sensor signals 18 and to transmit sensor signals 18 to control system 12. Non-limiting examples of sensor 16 include video, radar, LiDAR, ultrasonic and motion sensors. In one embodiment, sensor 16 is an optical sensor configured to sense optical images of an environment proximate to computer-controlled machine 10.

Control system 12 is configured to receive sensor signals 18 from computer-controlled machine 10. As set forth below, control system 12 may be further configured to learn actuator control commands 20 depending on the sensor signals and to transmit actuator control commands 20 to actuator 14 of computer-controlled machine 10.

As shown in FIG. 1, control system 12 includes receiving unit 22. Receiving unit 22 may be configured to receive sensor signals 18 from sensor 30 and to transform sensor signals 18 into input signals x. In an alternative embodiment, sensor signals 18 are received directly as input signals x without receiving unit 22. Each input signal x may be a portion of each sensor signal 18. Receiving unit 22 may be configured to process each sensor signal 18 to product each input signal x. Input signal x may include data corresponding to an image recorded by sensor 16.

Control system 12 includes classifier 24. Classifier 24 may be configured to learn actuator control commands 20 from input signals x using a machine learning (ML) algorithm, such as a neural network or recurrent neural network (RNN). Control system 12 can be configured to train the ML algorithm. The ML algorithm may be a meta-learned evolution strategy for black box optimization as disclosed in one or more embodiments herein.

Classifier 24 is configured to be parametrized by one or more parameters. The parameters may be stored in and provided by non-volatile storage 26. Classifier 24 is configured to determine output signals y from input signals x. Each output signal y includes information that assigns one or more labels to each input signal x. Classifier 24 may transmit output signals y to conversion unit 28. Conversion unit 28 is configured to covert output signals y into actuator control commands 20. Control system 12 is configured to transmit actuator control commands 20 to actuator 14, which is configured to actuate computer-controlled machine 10 in response to actuator control commands 20. In another embodiment, actuator 14 is configured to actuate computer-controlled machine 10 based directly on output signals y.

Upon receipt of actuator control commands 20 by actuator 14, actuator 14 is configured to execute an action corresponding to the related actuator control command 20. Actuator 14 may include a control logic configured to transform actuator control commands 20 into a second actuator control command, which is utilized to control actuator 14. In one or more embodiments, actuator control commands 20 may be utilized to control a display instead of or in addition to an actuator.

In another embodiment, control system 12 includes sensor 16 instead of or in addition to computer-controlled machine 10 including sensor 16. Control system 12 may also include actuator 14 instead of or in addition to computer-controlled machine 10 including actuator 14.

As shown in FIG. 1, control system 12 also includes processor 30 and memory 32. Processor 30 may include one or more processors. Memory 32 may include one or more memory devices. The classifier 24 (e.g., ML algorithms) of one or more embodiments may be implemented by control system 12, which includes non-volatile storage 26, processor 30 and memory 32.

Non-volatile storage 26 may include one or more persistent data storage devices such as a hard drive, optical drive, tape drive, non-volatile solid-state device, cloud storage or any other device capable of persistently storing information. Processor 30 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 32. Memory 32 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 30 may be configured to read into memory 32 and execute computer-executable instructions residing in non-volatile storage 26 and embodying one or more ML algorithms and/or methodologies of one or more embodiments. Non-volatile storage 26 may include one or more operating systems and applications. Non-volatile storage 26 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 30, the computer-executable instructions of non-volatile storage 26 may cause control system 12 to implement one or more of the ML algorithms and/or methodologies as disclosed herein. Non-volatile storage 26 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 2:
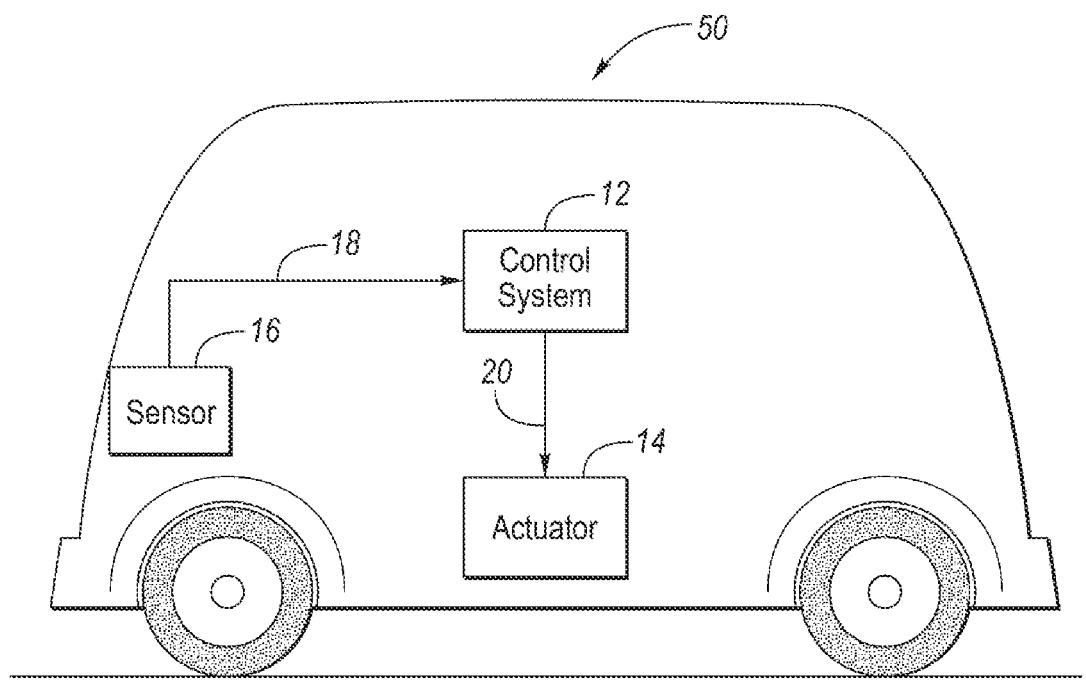
FIG. 2 depicts a schematic diagram of the control system of FIG. 1 configured to control a vehicle, which may be partially autonomous vehicle or a partially autonomous robot.

FIG. 2 depicts a schematic diagram of control system 12 configured to control vehicle 50, which may be an at least partially autonomous vehicle or an at least partially autonomous robot. As shown in FIG. 2, vehicle 50 includes actuator 14 and sensor 16. Sensor 16 may include one or more video sensors, radar sensors, ultrasonic sensors, LiDAR sensors, and/or position sensors (e.g. GPS). One or more of the one or more specific sensors may be integrated into vehicle 50. Alternatively or in addition to one or more specific sensors identified above, sensor 16 may include a software module configured to, upon execution, determine a state of actuator 14. One non-limiting example of a software module includes a weather information software module configured to determine a present or future state of the weather proximate vehicle 50 or other location.

Classifier 24 of control system 12 of vehicle 50 may be configured to detect objects in the vicinity of vehicle 50 dependent on input signals x. In such an embodiment, output signal y may include information characterizing the vicinity of objects to vehicle 50. Actuator control command 20 may be determined in accordance with this information. The actuator control command 20 may be used to avoid collisions with the detected objects.

In embodiments where vehicle 50 is an at least partially autonomous vehicle, actuator 14 may be embodied in a brake, a propulsion system, an engine, a drivetrain, or a steering of vehicle 50. Actuator control commands 20 may be determined such that actuator 14 is controlled such that vehicle 50 avoids collisions with detected objects. Detected objects may also be classified according to what classifier 24 deems them most likely to be, such as pedestrians or trees. The actuator control commands 20 may be determined depending on the classification.

In other embodiments where vehicle 50 is an at least partially autonomous robot, vehicle 50 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 20 may be determined such that a propulsion unit, steering unit and/or brake unit of the mobile robot may be controlled such that the mobile robot may avoid collisions with identified objects.

In another embodiment, vehicle 50 is an at least partially autonomous robot in the form of a gardening robot. In such embodiment, vehicle 50 may use an optical sensor as sensor 16 to determine a state of plants in an environment proximate vehicle 50. Actuator 14 may be a nozzle configured to spray chemicals. Depending on an identified species and/or an identified state of the plants, actuator control command 20 may be determined to cause actuator 14 to spray the plants with a suitable quantity of suitable chemicals.

Vehicle 50 may be an at least partially autonomous robot in the form of a domestic appliance. Non-limiting examples of domestic appliances include a washing machine, a stove, an oven, a microwave, or a dishwasher. In such a vehicle 50, sensor 16 may be an optical sensor configured to detect a state of an object which is to undergo processing by the household appliance. For example, in the case of the domestic appliance being a washing machine, sensor 16 may detect a state of the laundry inside the washing machine. Actuator control command 20 may be determined based on the detected state of the laundry.

Figure 3:
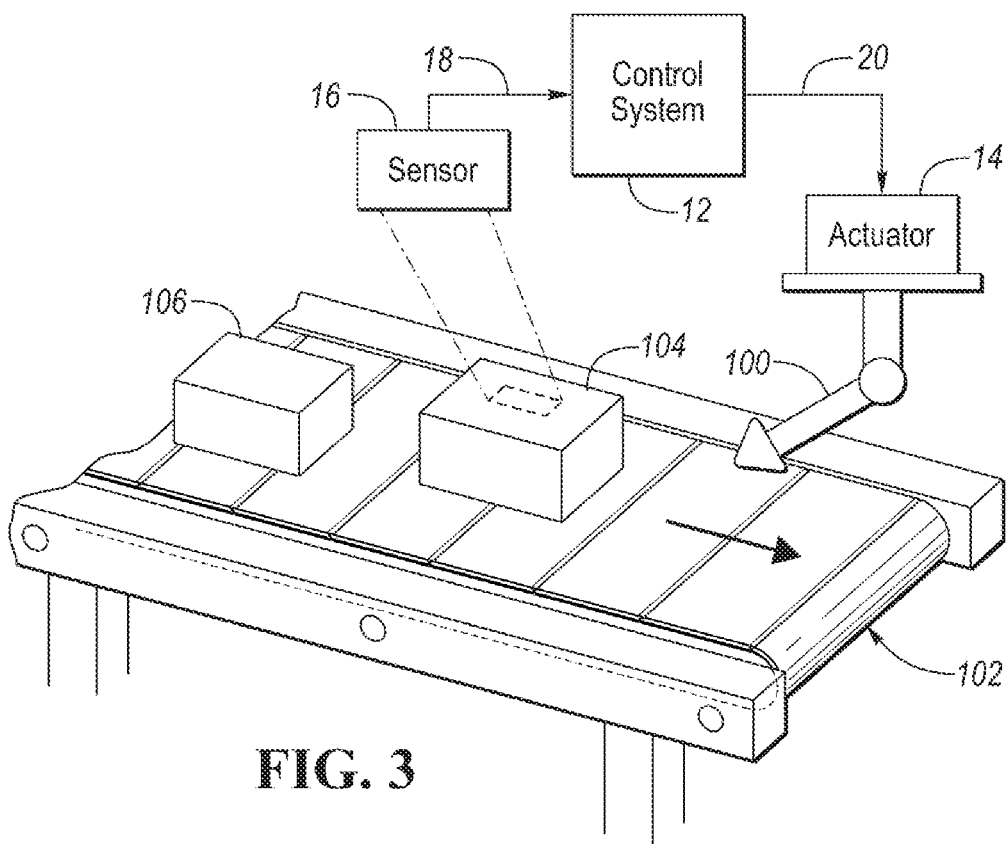
FIG. 3 depicts a schematic diagram of the control system of FIG. 1 configured to control a manufacturing machine, such as a punch cutter, a cutter or a gun drill, of manufacturing system, such as part of a production line.

FIG. 3 depicts a schematic diagram of control system 12 configured to control manufacturing machine 100, such as a punch cutter, a cutter or a gun drill, of manufacturing system 102, such as part of a production line. Control system 12 may be configured to control actuator 14, which is configured to control manufacturing machine 100.

Sensor 16 of manufacturing machine 100 may be an optical sensor configured to capture one or more properties of manufactured product 104. Classifier 24 may be configured to determine a state of manufactured product 104 from one or more of the captured properties. Actuator 14 may be configured to control manufacturing machine 100 depending on the determined state of manufactured product 104 for a subsequent manufacturing step of manufactured product 104. The actuator 14 may be configured to control functions of manufacturing machine 100 on subsequent manufactured product 106 of manufacturing machine 100 depending on the determined state of manufactured product 104.

Figure 4:
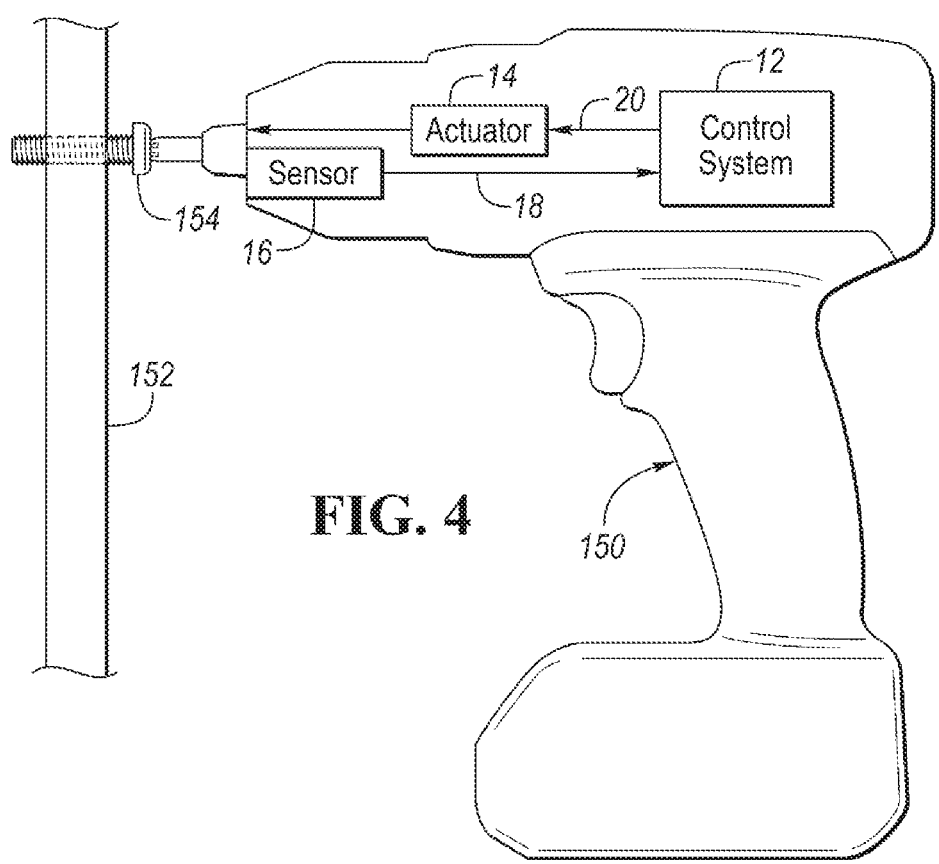
FIG. 4 depicts a schematic diagram of the control system of FIG. 1 configured to control a power tool, such as a power drill or driver, that has an at least partially autonomous mode.

FIG. 4 depicts a schematic diagram of control system 12 configured to control power tool 150, such as a power drill or driver, that has an at least partially autonomous mode. Control system 12 may be configured to control actuator 14, which is configured to control power tool 150.

Sensor 16 of power tool 150 may be an optical sensor configured to capture one or more properties of work surface 152 and/or fastener 154 being driven into work surface 152. Classifier 24 may be configured to determine a state of work surface 152 and/or fastener 154 relative to work surface 152 from one or more of the captured properties. The state may be fastener 154 being flush with work surface 152. The state may alternatively be hardness of work surface 154. Actuator 14 may be configured to control power tool 150 such that the driving function of power tool 150 is adjusted depending on the determined state of fastener 154 relative to work surface 152 or one or more captured properties of work surface 154. For example, actuator 14 may discontinue the driving function if the state of fastener 154 is flush relative to work surface 152. As another non-limiting example, actuator 14 may apply additional or less torque depending on the hardness of work surface 152.

Figure 5:
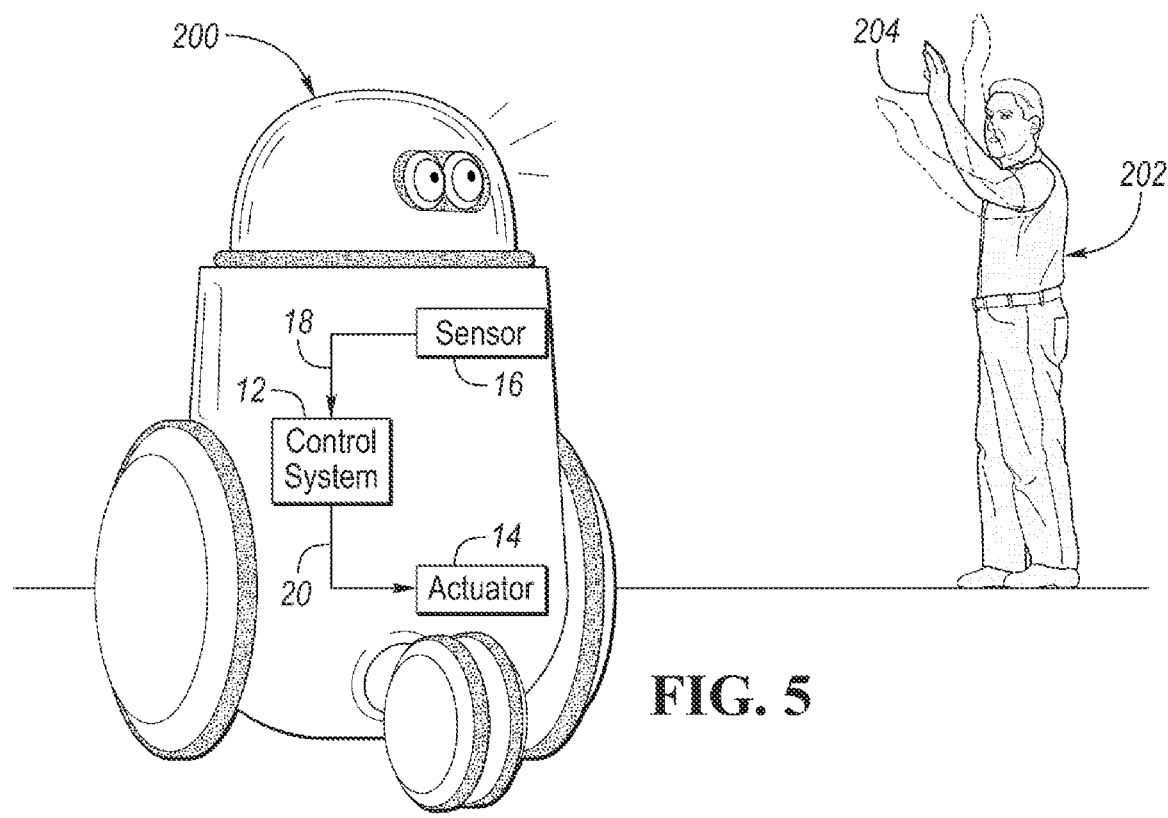
FIG. 5 depicts a schematic diagram of the control system of FIG. 1 configured to control an automated personal assistant.

FIG. 5 depicts a schematic diagram of control system 12 configured to control automated personal assistant 200. Control system 12 may be configured to control actuator 14, which is configured to control automated personal assistant 200. Automated personal assistant 200 may be configured to control a domestic appliance, such as a washing machine, a stove, an oven, a microwave or a dishwasher.

Sensor 16 may be an optical sensor and/or an audio sensor. The optical sensor may be configured to receive video images of gestures 204 of user 202. The audio sensor may be configured to receive a voice command of user 202.

Control system 12 of automated personal assistant 200 may be configured to determine actuator control commands 20 configured to control system 12. Control system 12 may be configured to determine actuator control commands 20 in accordance with sensor signals 18 of sensor 16. Automated personal assistant 200 is configured to transmit sensor signals 18 to control system 12. Classifier 24 of control system 12 may be configured to execute a gesture recognition algorithm to identify gesture 204 made by user 202, to determine actuator control commands 20, and to transmit the actuator control commands 20 to actuator 14. Classifier 24 may be configured to retrieve information from non-volatile storage in response to gesture 204 and to output the retrieved information in a form suitable for reception by user 202.

Figure 6:
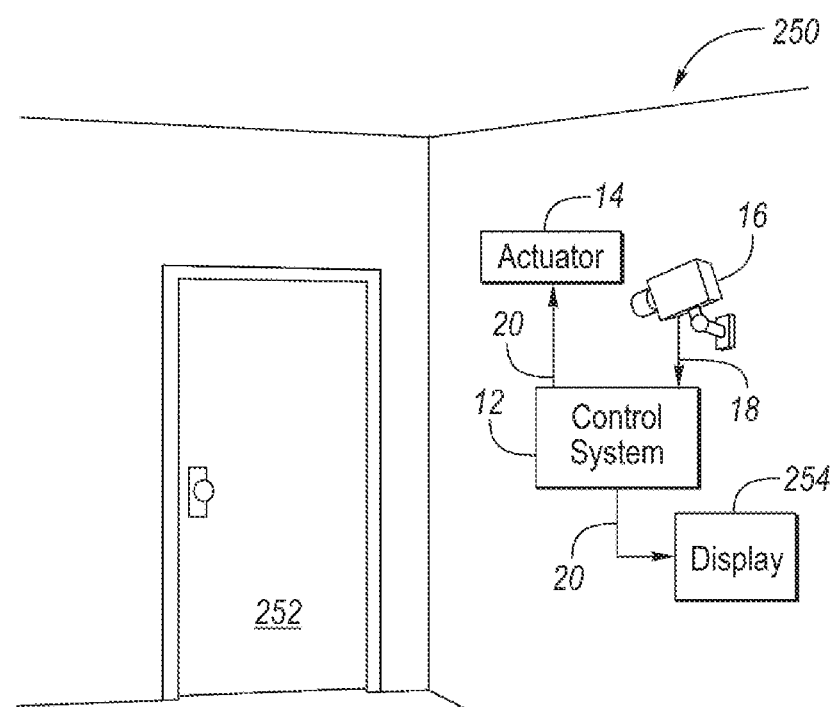
FIG. 6 depicts a schematic diagram of the control system of FIG. 1 configured to control a monitoring system, such as a control access system or a surveillance system.

FIG. 6 depicts a schematic diagram of control system 12 configured to control monitoring system 250. Monitoring system 250 may be configured to physically control access through door 252. Sensor 16 may be configured to detect a scene that is relevant in deciding whether access is granted. Sensor 16 may be an optical sensor configured to generate and transmit image and/or video data. Such data may be used by control system 12 to detect a person's face.

Classifier 24 of control system 12 of monitoring system 250 may be configured to interpret the image and/or video data by matching identities of known people stored in non-volatile storage 26, thereby determining an identity of a person. Classifier 12 may be configured to generate and an actuator control command 20 in response to the interpretation of the image and/or video data. Control system 12 is configured to transmit the actuator control command 20 to actuator 12. In this embodiment, actuator 12 may be configured to lock or unlock door 252 in response to the actuator control command 20. In other embodiments, a non-physical, logical access control is also possible.

Monitoring system 250 may also be a surveillance system. In such an embodiment, sensor 16 may be an optical sensor configured to detect a scene that is under surveillance and control system 12 is configured to control display 254. Classifier 24 is configured to determine a classification of a scene, e.g. whether the scene detected by sensor 16 is suspicious. Control system 12 is configured to transmit an actuator control command 20 to display 254 in response to the classification. Display 254 may be configured to adjust the displayed content in response to the actuator control command 20. For instance, display 254 may highlight an object that is deemed suspicious by classifier 24.

Figure 7:
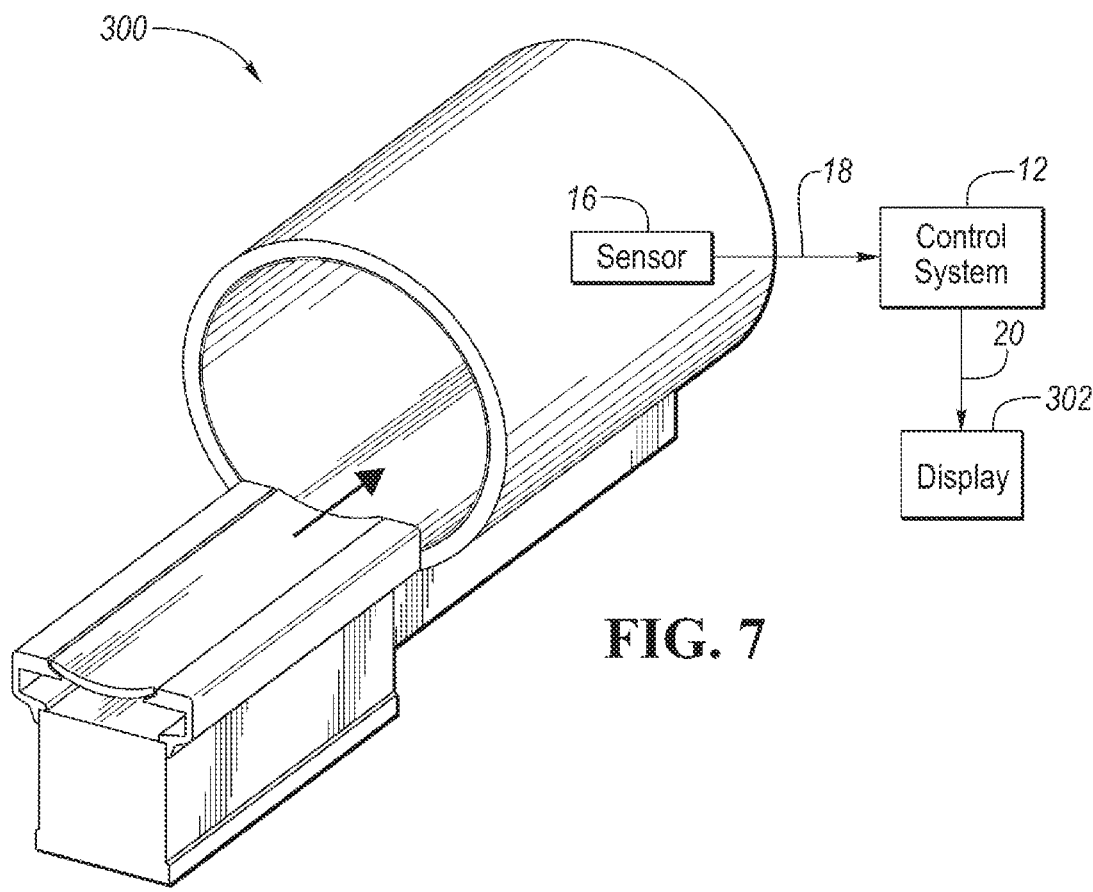
FIG. 7 depicts a schematic diagram of the control system of FIG. 1 configured to control an imaging system, for example an MRI apparatus, x-ray imaging apparatus or ultrasonic apparatus.

FIG. 7 depicts a schematic diagram of control system 12 configured to control imaging system 300, for example an MRI apparatus, x-ray imaging apparatus or ultrasonic apparatus. Sensor 16 may, for example, be an imaging sensor. Classifier 24 may be configured to determine a classification of all or part of the sensed image. Classifier 24 may be configured to determine or select an actuator control command 20 in response to the classification. For example, classifier 24 may interpret a region of a sensed image to be potentially anomalous. In this case, actuator control command 20 may be determined or selected to cause display 302 to display the imaging and highlighting the potentially anomalous region.

Evolution strategies have been used as black box function optimizers. Evolution strategies utilize iterative black box optimization methods. An evolution strategy attempts to find a global minimizer of an unknown (e.g. black box) loss function $f$ in a feasible space X. Equation (1) shows this computation in algebraic terms.

$$\operatorname*{argmin}_{x \in X} f(x) \qquad (1)$$

Examples of existing evolution strategies include exponential natural evolution strategy (xNES) and the covariance matrix adaptation evolution strategy (CMA-ES). Evolution strategies are configured to perform optimization on a wide variety of objective functions without tuning hyperparameters. Existing evolution strategies use predefines heuristics and hand-tuned hyperparameters to perform their updates to their parameters. Standard evolution strategies do not use any knowledge about the structure of a function that is being optimized. Therefore, optimization performance cannot be improved with this knowledge. Accordingly, there is a need for computational optimization methods that incorporate prior knowledge of an optimization problem by first training on a set of similar objective functions.

In one or more embodiments, computational methods and computer systems are presented that exploit knowledge about the structure of a function to improve optimization performance. In one or more embodiments, the computational methods and computer systems meta-learns a black box optimization algorithm using ML, e.g. deep learning. A recurrent neural network (RNN) may be trained to perform the black box optimization. In one embodiment, the computational methods and computer systems use deep meta-learning to improve the performance of an optimization algorithm on a specific class of functions. Such a class may broadly refer to the properties or characteristics of the functions in the class, such as the amount of noise in the evaluation of the function or the degree of a set of polynomials, or it may be very specific, such as functions that arise from numerical simulations of a particular experiment. The computational methods and computer systems may include meta-learning parameters θ that are configured to define how the evolution strategy updates its parameters. For example, static hyperparameters (e.g. learning rates, step sizes, coefficients controlling momentum, and/or coefficients controlling the weight given to each term in an update to its parameters) in the evolution strategy algorithm may be converted into learnable parameters. As another example, heuristic updates to m and a may be made with ML, e.g. a neural network, in which case θ represents the weights and/or biases of the neural network.

In one or more embodiments, because the operations performed by an evolution strategy are differentiable, the evolution strategy algorithm of the computational methods and computer systems is implemented into an auto differentiation framework where the algorithm computes a value and automatically constructs a procedure for computing derivatives of the value. The meta-learning parameters θ may then be trained in a supervised learning fashion with gradient descent.

In one evolution strategy of one or more embodiments, an objective function $f: R^n \rightarrow R$ is stored in non-volatile storage 354. Memory 358 includes instructions that when executed by processor 356 executes an evolution strategy configured to optimize $f$ by iteratively updating one or more of the following parameters: $m \in R^n$, $\sigma \in R$, $C \in R^{n \times n}$ of a multivariate Gaussian $N(m, \sigma C)$. m is a mean value. σ is a step-size. C is a covariance matrix. The iterative steps may be defined as t=1, ..., T. During each step t, the following steps may be iteratively performed by processor 356. The first step may have two iterative, sub-parts. The two sub-parts are iteratively executed for a number of samples defined as i=1, ..., λ. The first sub-part is sampling A number of samples $z_i \sim N(0,1)$, which is a multivariate normal distribution with zero mean and unity covariance matrix, and is otherwise referred to as a generation. A vector distributed according to N(0,1) has independent, (0,1)-normally distributed components. The second sub-part is scaling and shifting the λ number of samples $z_i \sim N(0,1)$ into $x_i$ samples using the following equation:

$$x_i = m + \sigma C^{\frac{1}{2}} z_i \quad (2)$$

In a second iterative step, the samples $x_1, \ldots, x_\lambda$ are ranked according to their function evaluations, such that the ranked samples satisfy $f(x_1) \leq f(x_2) \leq \ldots \leq f(x_\lambda)$. In a third iterative step, the evolution parameters $m \in R^n$, $\sigma \in R$, $C \in R^{n \times n}$ are updated according to $x_1, \ldots, x_\lambda$ and one or more parameters θ, which is determined using a training method of one or more embodiments. As part of the updating step, the mean m of the Gaussian may be updated by replacing it with a weighted combination of samples in the current generation, with more weight placed on samples with better (i.e., smaller) function values.

The optimization algorithm for function $f$ may be trained on a training set of functions, as described herein with respect to one or more embodiments. The optimization algorithm for function $f$ may be repeated (e.g. the three iterative steps) until a termination criterion is reached. For example, the process may be ended if the best function value does not change after a certain number of iterations, such as 100 or 1,000 iterations, or any number of iterations therebetween.

Figure 8:
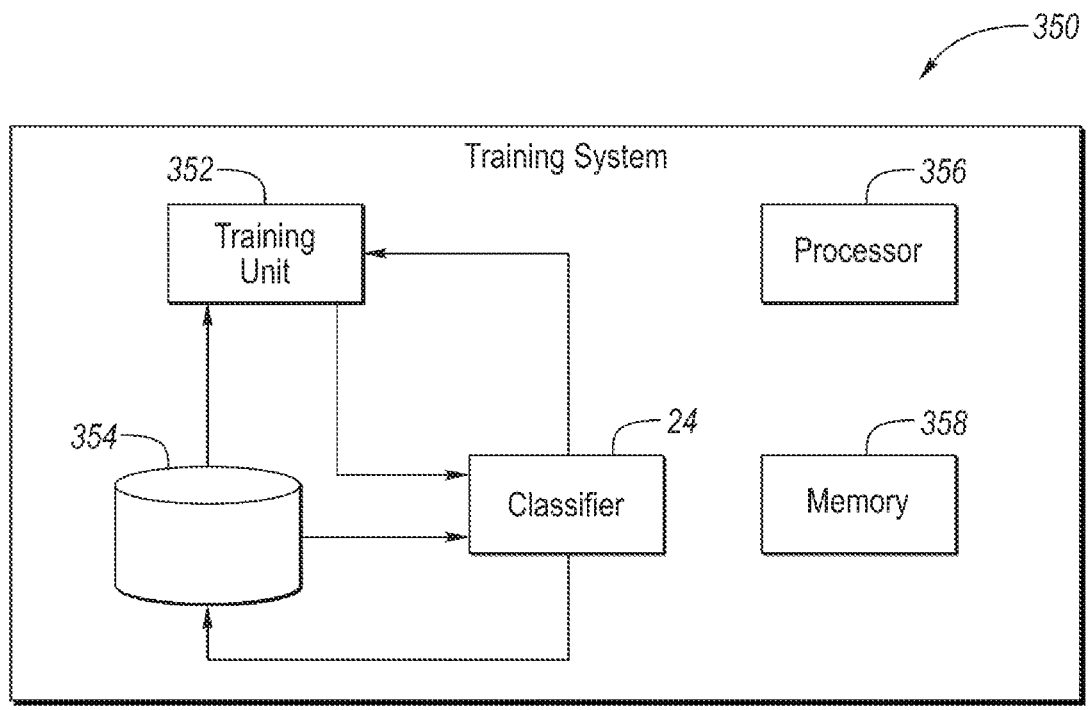
FIG. 8 depicts a schematic diagram of a training system for training a classifier according to one or more embodiments.

FIG. 8 depicts a schematic diagram of training system 350 for training classifier 24. In one or more embodiments, one or more embodiments computational methods and computer systems are presented to train classifier 24 that can be used in one or more of the applications identified in FIGS. 2-7. For example, classifier 24 may be implemented with a robot to learn to perform a certain task or learn the best parameters for a laser or other manufacturing tool.

Classifier 24 may be a meta-evolution strategy algorithm. A set of training functions (F) and initial meta-learning parameters θ of an evolution strategy may be stored in non-volatile storage 354. Training system 350 is configured to execute a training procedure to find optimized meta-learning parameters θ. Memory 358 includes instructions that when executed by processor 356 executes the training procedure. Training system 350 is configured to execute the training procedure in a series of steps. The first step may be sampling a function $f \in F$ and an initial mean $m^{\{(0)\}} \sim U[-1, 1]^n$. The second step may be computing means $m^{(1)}, \ldots, m^{(T)}$ by executing one of the optimization algorithms of one or more embodiment on objective function $f$ with initial mean $m^{(0)}$ for T number of steps in t=1, ..., T. The third step may be computing a loss L from evaluated means $f(m^0), \ldots, f(m^T)$ to obtain a scalar loss. The loss L may be in the form of a loss function $L(f(m^0), \ldots, f(m^T))$. The fourth step may include updating parameters θ using the gradients of the loss function $\nabla_\theta L$. Backpropagation can be performed to train parameters θ with respect to the loss.

Figure 9:
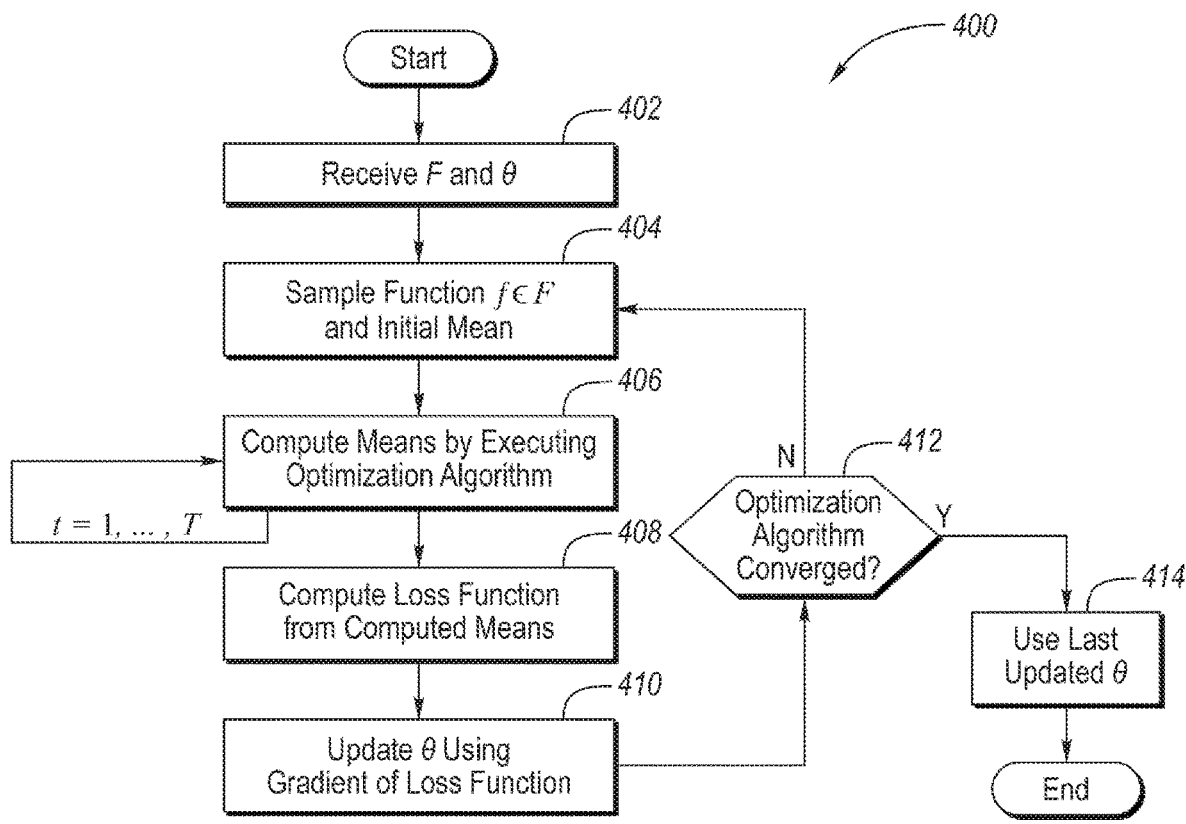
FIG. 9 depicts a flow chart of a computational method for training a classifier (e.g. a black box algorithm) according to one or more embodiments.

FIG. 9 depicts flow chart 400 of a computational method for training classifier 24 (e.g. a black box algorithm) using a meta-learned evolution strategy according to one embodiment. The computational method may be carried out using training system 350. The computational method for training classifier 24 may be signified by a training procedure.

In step 402, input is received for the training method. In one embodiment, the input includes a set of training functions F and initial meta-learning parameters θ of the evolution strategy. One or more of the set of training functions F are used in step 404.

In step 404, a function $f \in F$ and an initial mean $m^{\{(0)\}} \sim U[-1, 1]^n$ are sampled. The function sampling and initial mean sampling are used in step 406 as set forth below.

In step 406, means $m^{(1)}, \ldots, m^{(T)}$ are computed by running a meta-learned evolution strategy algorithm (e.g. the algorithm identified in FIG. 10) on the objective function $f$ with the initial mean $m^{\{(0)\}}$. As shown in FIG. 9, step 406 is repeated for a number of T steps. The computed means after a number of T steps are used in step 408 as set forth below.

In step 408, a loss function is computed from the means computed in step 406. Step 408 may be computing a loss L from evaluated means $f(m^0), \ldots, f(m^T)$ to obtain a scalar loss. The loss L may be in the form of a loss function $L(f)(m^0), \ldots, f(m^T))$. Other parameters may be included in this loss function calculation.

In step 410, the meta-learned parameters θ of the evolution strategy are updated using the gradients of the loss function $\nabla_\theta L$. While step 410 uses gradients of the loss function, in other embodiments, this step may be performed by gradient descent or other deep learning optimizers, such as Adam.

Steps 404, 406, 408 and 410 are repeated until the meta-learned optimization algorithm converges, as set forth in step 412. The last updated meta-learned parameters θ values of step 414 are used in the meta-learned optimization algorithm as set forth below.

As shown in FIG. 9, one function is used to train θ at a time. In one or more other embodiments, the training procedure may be run for a minibatch of functions, with a minibatch size up to or exceeding 128 functions. In other embodiments, the number of functions in the minibatch may be between 20 and 30. In yet other embodiments, the number of functions in the minibatch may exceed 128. In alternative embodiments, samples from a distribution, e.g. samples from a Gaussian process, may be utilized rather than from a prescribed set of training functions.

Figure 10:
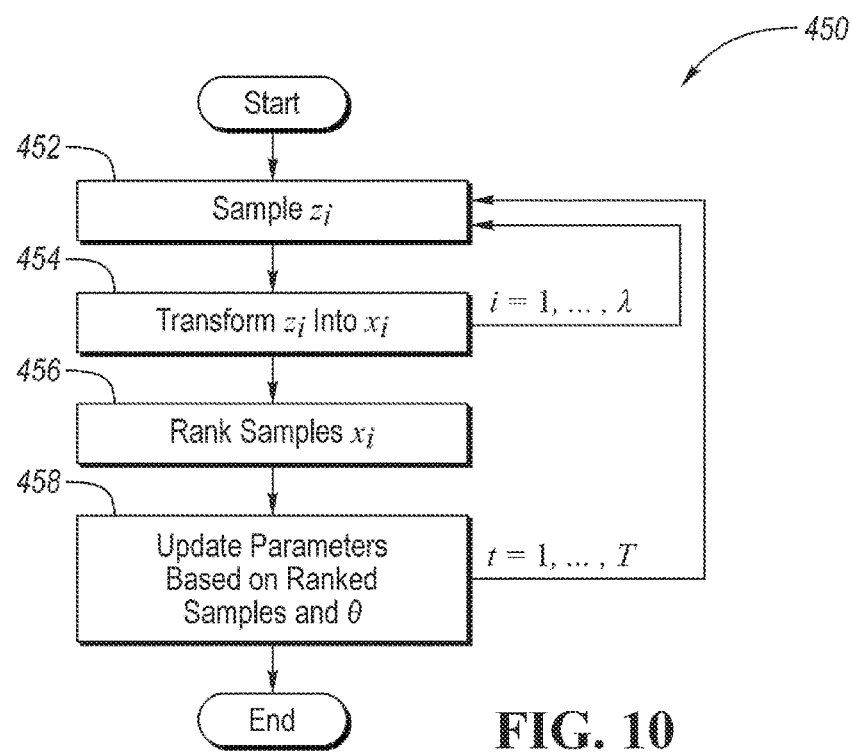
FIG. 10 depicts a flow chart of a computational method for using a classifier (e.g. a black box algorithm) using a meta-learned evolution strategy according to one embodiment.

FIG. 10 depicts flow chart 450 of a computational method for using classifier 24 (e.g. a black box algorithm) using a meta-learned evolution strategy according to one embodiment. The computational method may be carried out using control system 12.

In step 452, $z_i \sim N(0,1)$ are sampled for $i=1, \ldots \lambda$. In step 454, $z_i$ is transformed using equation (2) by scaling and shifting $z_i$. As shown in FIG. 10, steps 452 and 454 are repeated for $i=1, \ldots, \lambda$. The transformed samples $x_i$ are used by step 456.

In step 456, the $x_i$ samples are ranked according to their function evaluations, such that the ranked samples satisfy $f(x_1) \leq f(x_2) \leq \ldots \leq f(x_\lambda)$. The ranked samples $x_i$ are used by step 458.

In step 458, the ranked samples $x_i$ and the last updated meta-learned parameters θ values of step 414 of FIG. 9 are used to update the evolution strategy parameters m, σ, and C of the black box optimization.

While as shown in FIG. 10 the meta-evolution strategy algorithm is run for a fixed number of T steps, it may also be run until a stopping criterion is reached. FIG. 10 also presents a fixed number of λ samples per generation, but this number can be varied or samples from previous generations may be utilized.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computational method for training a meta-learned, evolution strategy black box optimization classifier to learn an actuator control command to actuate a computer-controlled machine, the method comprising:

receiving one or more training functions and one or more initial meta-learning parameters of the meta-learned, evolution strategy black box optimization classifier;

sampling a generation of samples λ of a sampled objective function from the one or more training functions and an initial mean (m) of the sampled objective function, the generation of samples λ is $z_i \sim N(0, I)$ with the initial mean value (m) of 0 and a covariance matrix (C) scaled and shifted into $x_i$ samples using the following equation:

$$x_i = m + \sigma C^{\frac{1}{2}} z_i,$$

where σ is a step-size;

for T number of steps in $t=1, \ldots, T$, computing a set of T number of means by running the meta-learned, evolution strategy black box optimization classifier on the sampled objective function using the initial mean (m);

computing a loss function from the set of T number of means;

updating the one or more initial meta-learning parameters of the meta-learned, evolution strategy black box optimization classifier in response to a characteristic of the loss function to obtain an updated meta-learned, evolution strategy black box optimization classifier including a weighted combination of the generation of samples λ with a greater weight placed on the samples λ in the generation of samples λ having better characteristics of the sampled objective function;

sending input signals obtained from a sensor into the updated meta-learned, evolution strategy block box optimization classifier to obtain output signals configured to characterize a classification of the input signals;

transmitting an actuator control command to an actuator of a computer-controlled machine in response to the output signals; and actuating the computer-controlled machine in response to the actuator control command.

2. The computational method of claim 1, further comprising:

sending input signals obtained from a sensor into the updated meta-learned, evolution strategy black box optimization classifier to obtain output signals configured to characterize a classification of the input signals; and transmitting an actuator control command to an actuator of a computer-controlled machine in response to the output signals.

3. The computational method of claim 1, wherein the characteristic of the loss function is gradients of the loss function.

4. The computational method of claim 1, wherein the characteristic of the loss function is gradient descent of the loss function.

5. The computational method of claim 1, wherein the updating step is carried out by a deep learning optimizer.

6. The computational method of claim 1, wherein the sampling step, the first computing step, the second computing step and the updating step are interactively performed within a loop until a stopping condition is met.

7. The computational method of claim 6, wherein the stopping condition is convergence of the meta-learned, evolution strategy black box optimization classifier.

8. A computational method for learning an actuator control command from a meta-learned, evolution strategy black box optimization classifier to actuate a computer-controlled machine, the method comprising:

sampling and transforming a generation of samples λ into a generation of transformed samples λ, the generation of transformed samples λ is $z_i \sim N(0, I)$ with a mean value (m) of 0 and a covariance matrix (C) scaled and shifted into $x_i$ samples using the following equation:

$$x_i = m + \sigma C^{\frac{1}{2}} z_i,$$

where σ is a step-size;

ranking the generation of transformed samples λ in response to one or more function evaluations of the generation of transformed samples λ to obtain a ranked generation of transformed samples λ;

updating one or more parameters of the meta-learned, evolution strategy black box optimization classifier in response to the ranked generation of transformed samples λ and one or more learned parameters trained on a set of objective functions sharing a functional characteristic with the learned, evolution strategy black box optimization classifier to obtain an updated meta-learned, evolution strategy black box optimization classifier including a weighted combination of the ranked generation of transformed samples λ with a greater weight placed on the transformed samples λ in the ranked generation of transformed samples λ having better values of the one or more functional evaluations;

sending input signals obtained from a sensor into the updated meta-learned, evolution strategy black box optimization classifier to obtain output signals configured to characterize a classification of the input signals;

transmitting an actuator control command to an actuator of a computer-controlled machine in response to the output signals; and actuating the computer-controlled machine in response to the actuator control command.

9. The computational method of claim 8, wherein the number of parameters include m, σ, and C.

10. The computational method of claim 9, wherein a neural network is used to update m and σ.

11. The computational method of claim 10, wherein the number of learned parameters represent one or both of weights and biases of the neural network.

12. The computational method of claim 8, wherein the generation of transformed samples λ are produced from a multivariate Gaussian N(m, σC).

13. The computational method of claim 8, wherein the one or more functional evaluations are one or more objective functional evaluations.

14. The computational method of claim 8, wherein the ranked generation of transformed samples λ satisfies $f(x_1) \leq f(x_2) \leq \ldots \leq f(x_v)$.

15. A computational method for training and using a meta-learned, evolution strategy black box optimization classifier to learn an actuator control command to actuate a computer-controlled machine, the method comprising:

receiving one or more learned parameters trained on a set of objective functions sharing a functional characteristic with the learned, evolution strategy black box optimization classifier and sampled from a generation of samples λ, the generation of samples λ is $z_i \sim N(0, I)$ with the initial mean value (m) of 0 and a covariance matrix (C) scaled and shifted into $x_i$ samples using the following equation:

$$x_i = m + \sigma C^{\frac{1}{2}} z_i,$$

where σ is a step-size; and updating the meta-learned, evolution strategy black box optimization classifier with the one or more learned parameters in response to the generation of samples λ to obtain an updated meta-learned, evolution strategy black box optimization classifier including a weighted combination of the generation of samples λ with a greater weight placed on the samples λ in the generation of samples λ having smaller values of one or more functional evaluations;

sending input signals obtained from a sensor into the updated meta-learned, evolution strategy black box optimization classifier to obtain output signals configured to characterize a classification of the input signals;

transmitting an actuator control command to an actuator of a computer-controlled machine in response to the output signals; and actuating the computer-controlled machine in response to the actuator control command.

16. The computational method of claim 15, wherein the number of learned parameters includes a learning rate.

17. The computational method of claim 15, wherein the one or more learned parameters includes a neural network.

18. The computational method of claim 15, wherein the generation of samples λ are produced from a multivariate Gaussian N(m, σC).

19. The computational method of claim 15, wherein the updating step includes updating the meta-learned, evolution strategy black box optimization classifier with the one or more learned parameters and one or more static parameters in response to the generation of samples λ.

* * * * *